(12) United States Patent
Kovacs et al.

(10) Patent No.: US 6,237,637 B1
(45) Date of Patent: May 29, 2001

(54) HOUSING FOR DIVERTER VALVE

(75) Inventors: Richard R. Kovacs, York, PA (US); Craig L. Iverson, Arroyo Grande, CA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/533,098

(22) Filed: Mar. 23, 2000

(51) Int. Cl.[7] .................................................... F16K 11/10
(52) U.S. Cl. ............................................. 137/883; 251/331
(58) Field of Search .............................. 137/883; 251/331

(56) References Cited

U.S. PATENT DOCUMENTS 5,657,786 * 8/1997 DuRoss et al. ......................... 137/15
6,024,123 * 2/2000 Weissfloch et al. .................. 137/599

* cited by examiner

*Primary Examiner*—John Fox
(74) *Attorney, Agent, or Firm*—Menotti J. Lombardi

(57) ABSTRACT

A diverter valve housing including: a body including a base and a plurality of walls cooperatively forming a chamber; a partition within the chamber dividing the chamber into a plurality of compartments; a first port in a first of the walls and accessing a first of the compartments; and, second and third ports in a second of the walls and respectively accessing second and third ones of the compartments; wherein the partition further includes a surface which partially defines the first compartment and the surface is at least partially sloped towards the second wall.

20 Claims, 7 Drawing Sheets

HOUSING FOR DIVERTER VALVE

FIELD OF INVENTION

The present invention pertains to diaphragm-type diverter valves, and in particular to a housing for a diaphragm-type diverter valve which exhibits improved drainage.

BACKGROUND OF THE INVENTION

It is often necessary in fluid process piping systems to divert the flow of fluid from one stream to another. Such can be conventionally accomplished using a diaphragm-type diverter valve, i.e. a three-way valve. Valves of this type divert the flow of fluids from a single inlet port to one or the other of two outlet ports by closing a diaphragm against an edge or weir of a partition within the valve housing, thus prohibiting fluid flow to the one port and accommodating flow to the other port. An example of this type of valve is disclosed in U.S. Pat. No. 5,427,150, entitled "HOUSING FOR A DIVERTER VALVE" issued to Richard A. Skaer, on Jun. 27, 1995, the entire disclosure of which is hereby incorporated by reference as if being set forth in its entirety herein.

With reference to FIGS. 1 and 2, there is shown a diverter valve housing 10 according to the teachings of the '150 patent comprising a body having a flat base 12, front and rear walls 14 and 16 respectively, and side walls 18 and 20, all which rise from the base 12. Front wall 14 has an inlet port 22 formed therein which opens into a chamber 24 formed within the housing 10. The chamber 24 has a curved drainage channel 26 at the bottom, and is subdivided by a partition 28. The rear wall 16 has a pair of outlet ports 30 and 32 formed therein which also respectively open into the chamber 24 in the housing 10. The partition 28 includes a tapered limb with walls between the ports 30 and 32. Consequently, the partition 28 forms the chamber 24 into a first compartment 34, into which the port 22 opens, a second compartment 36 into which port 30 opens, and a third compartment 38 into which port 32 opens (see FIG. 2).

Side walls 18 and 20 have openings 40 and 42 formed therein, and the partition 28 has edges 44 and 46 which bisect the openings 40 and 42. Additionally, the edges 44 and 46 define weirs which comprise recesses 48 and 50 against which diaphragms set, or from which diaphragms remove, to prohibit or to permit fluid flow through one or the other of the ports 30 and 32.

Referring now also to FIG. 3, there is illustrated the housing 10 of FIGS. 1 and 2 cross-sectioned through the center of the openings 40 and 42. In addition, FIG. 3 shows the diaphragms 52 and 54, with respective handwheel-actuated compressors 56 and 58 attached thereto. Diaphragm 52 is closed against weir or edge 44, and diaphragm 54 is removed from weir or edge 46. As a result, and as is conventionally understood, fluid flow from port 22 to port 30 is prohibited, and flow is accommodated from port 22 to port 32.

To insure against the trapping of fluids in the housing 10, when the latter is horizontally disposed, as part of a diverter valve in a piping system, the '150 invention provides a horizontal drainage plane. The lowermost portions of the ports 22, 30 and 32, the openings 40 and 42, and the weirs or edges 44 and 46 are contiguous with, and fair into, the drainage channel 26. There is offered, in the housing 10, then, no pocket or recess in which a residual fluid can pool. In addition, the side walls 18 and 20, as shown are inclined from the vertical, defining the front and rear walls 14 and 16 substantially triangular. It has been found that by inclining the walls 18 and 20, with an angle there between of from forty to eighty degrees of arc, the full drainage of liquid through the housing 10 is greatly facilitated. The horizontal drainage plane of the housing 10 is represented by the flow lines 120 shown in FIGS. 1 and 2.

As has been discovered, when a diverter valve of this type is installed in fluid process piping systems in a vertical disposition and when fluid flow is halted, the housing 10 typically exhibits a sufficiently thorough drainage there through for many processes. However, there are piping systems which require the diverter valve exhibit an extraordinarily high amount of drainage as even a small amount of residual fluid remaining in the housing will be conducted out with a next flow of fluid, when the valve is operated again, thus contaminating the successive flow of fluid. This represents a significant problem in pharmaceutical and biotech process applications for example, where cleanliness and sterility are vital.

It is an object of the present invention to overcome this problem with a valve that exhibits this extraordinarily high amount of drainage whether it is installed in a horizontal or vertical position.

SUMMARY OF THE INVENTION

A diverter valve housing including: a body including a base and a plurality of walls cooperatively forming a chamber; a partition within the chamber dividing the chamber into a plurality of compartments; a first port in a first of the walls and accessing a first of the compartments; and, second and third ports in a second of the walls and respectively accessing second and third ones of the compartments; wherein the partition further includes a surface which partially defines the first compartment and the surface is at least partially sloped towards the second wall.

DETAILED DESCRIPTION OF THE INVENTION

Figure 4:
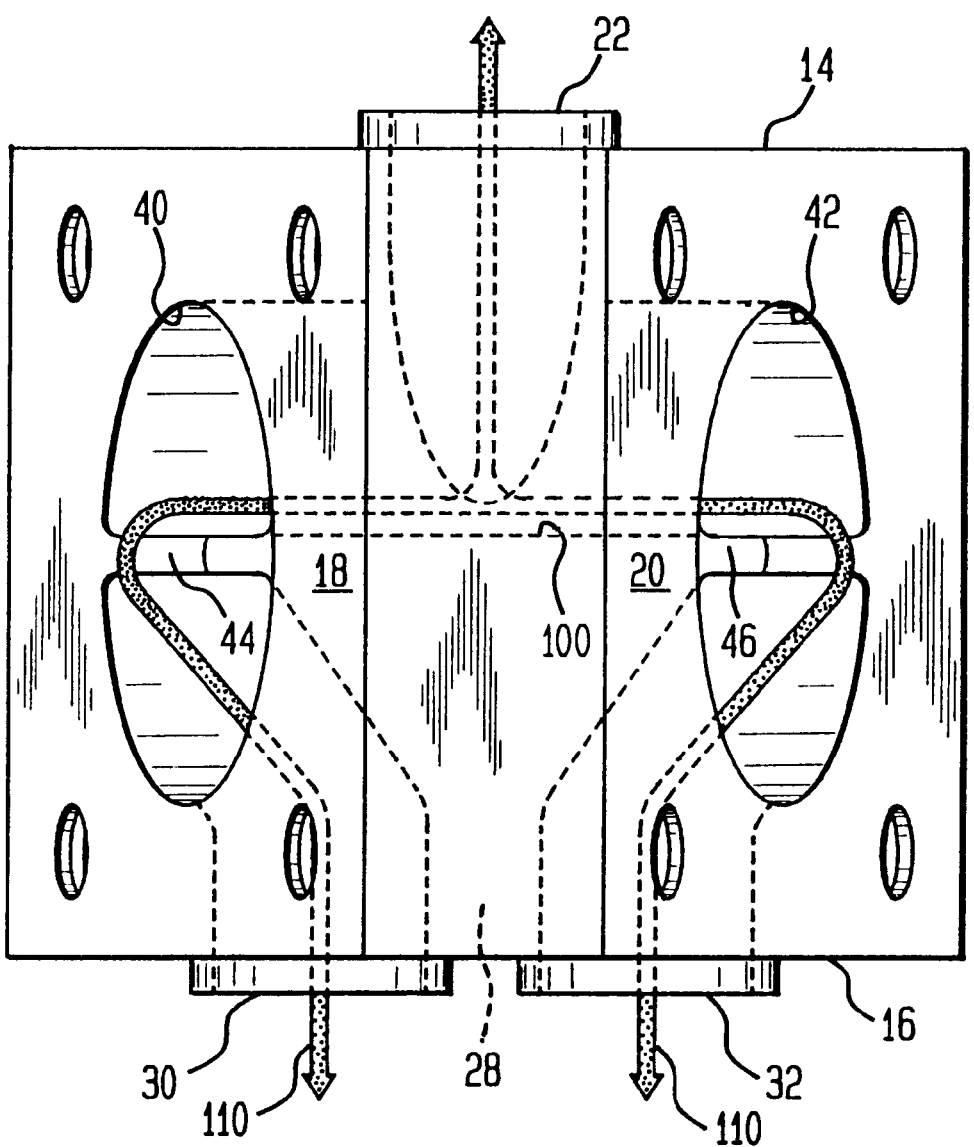
FIG. 4 is a top, plan view of the housing of FIGS. 1 and 2 vertically disposed.

Referring now to FIG. 4, when the housing 10 is vertically disposed within a process system such that the port 22 is disposed above the ports 30 and 32 it has been discovered the partition 28 as has been described may partially inhibit drainage of the body 10. The partition 28 typically includes a relatively large, flat surface 100 on one side of the weirs 44, 46. This surface 100 faces inlet port 22.

The surface 100 in the embodiment illustrated in FIGS. 1–4 takes the form of a substantially triangular, horizontal surface when the housing 10 has been installed in a vertical pipeline. Thus, with the housing 10 installed in a vertical pipeline as has been described, this surface 100 provides a shelf which, because of surface tension for example, may not sufficiently drain when the flow of fluid is halted. The drainage of fluid after the flow has halted is illustrated by path 110 in FIG. 4.

Figure 1:
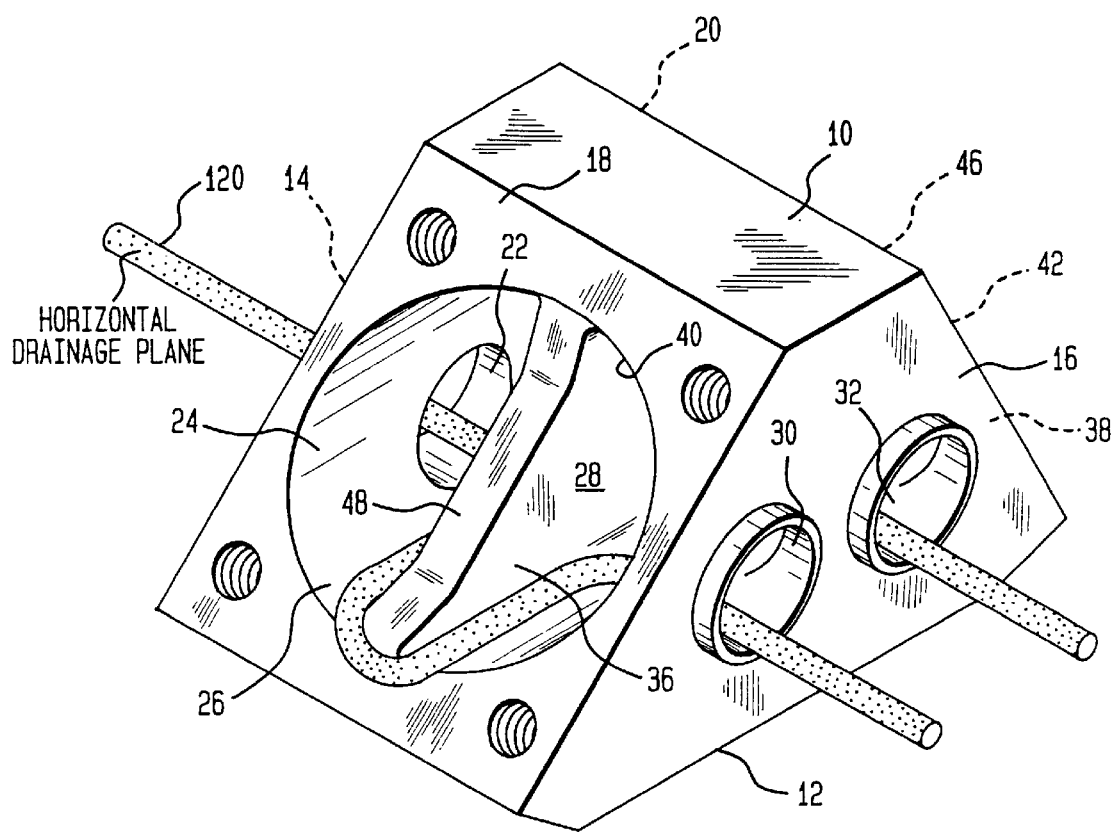
FIG. 1 is a perspective illustration of a prior art diverter valve housing.
Figure 2:
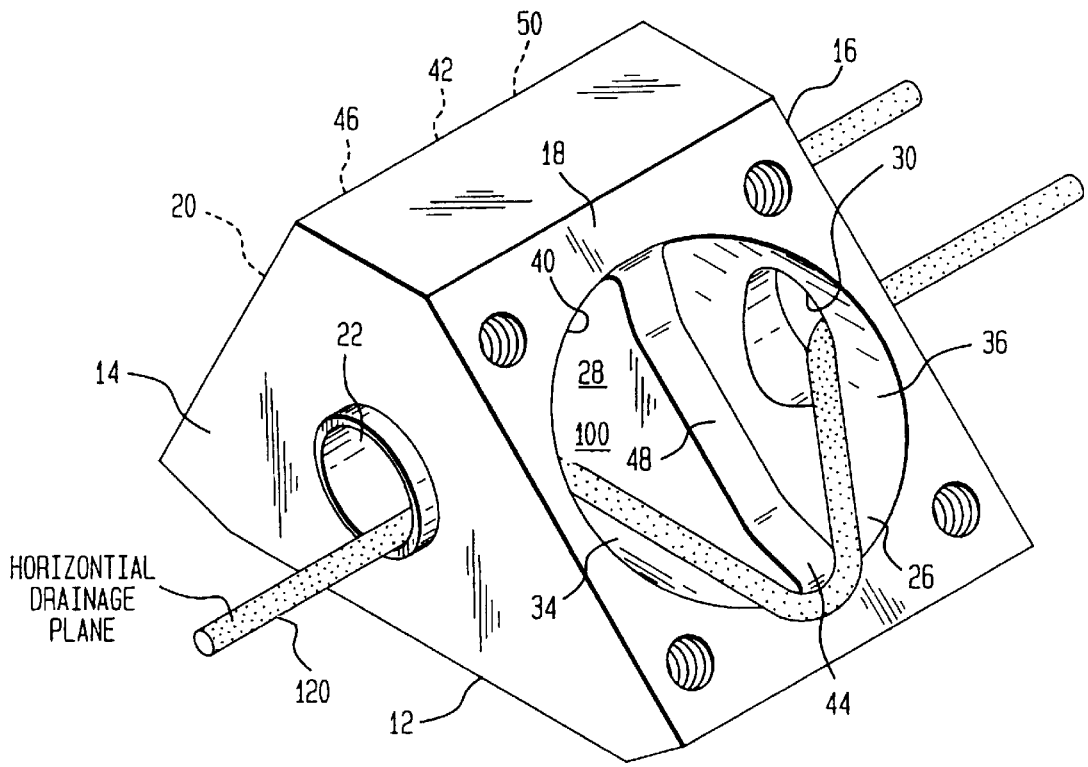
FIG. 2 is a perspective illustration of the housing of FIG. 1, the same taken from a different angle thereof.
Figure 3:
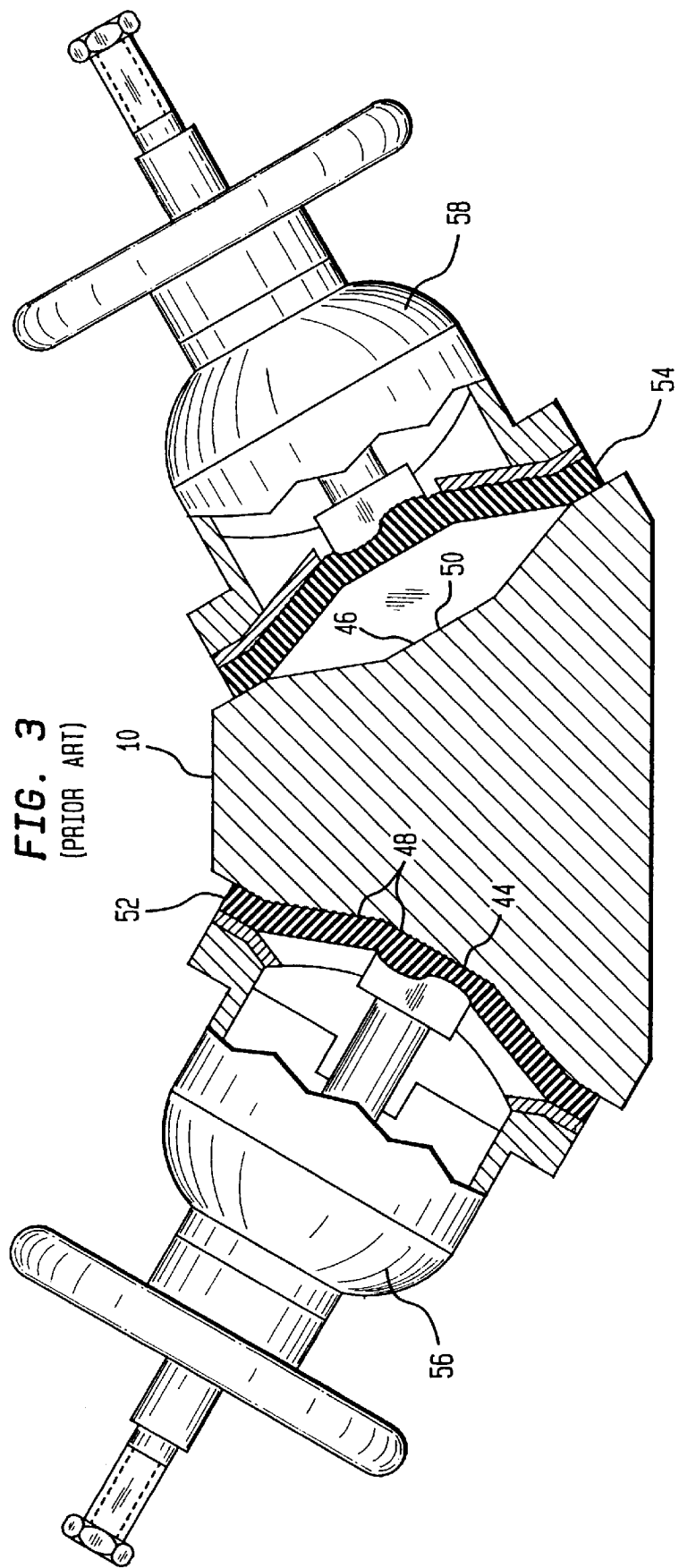
FIG. 3 is a combined cross-section and full line illustration of a diverter valve which incorporates the housing of FIGS. 1 and 2, the housing being shown in the cross-section, and the diaphragms and compressors therefor being shown substantially in full line depiction.

According to the present invention, the surface 100 is sloped towards the ports 30, 32 so as to induce any fluid left upon the surface 100, after fluid flow is halted, to more efficiently to drain. A slope as little as ½ of one degree (0.5°) has been found to be effective. The slope can be increased to any desired amount, providing the horizontal drainage plane 120 as is illustrated in FIGS. 1 and 2 are maintained to allow for proper drainage in a horizontal disposition of the housing 10 consistently with the teachings of the '150 patent.

Figure 5:
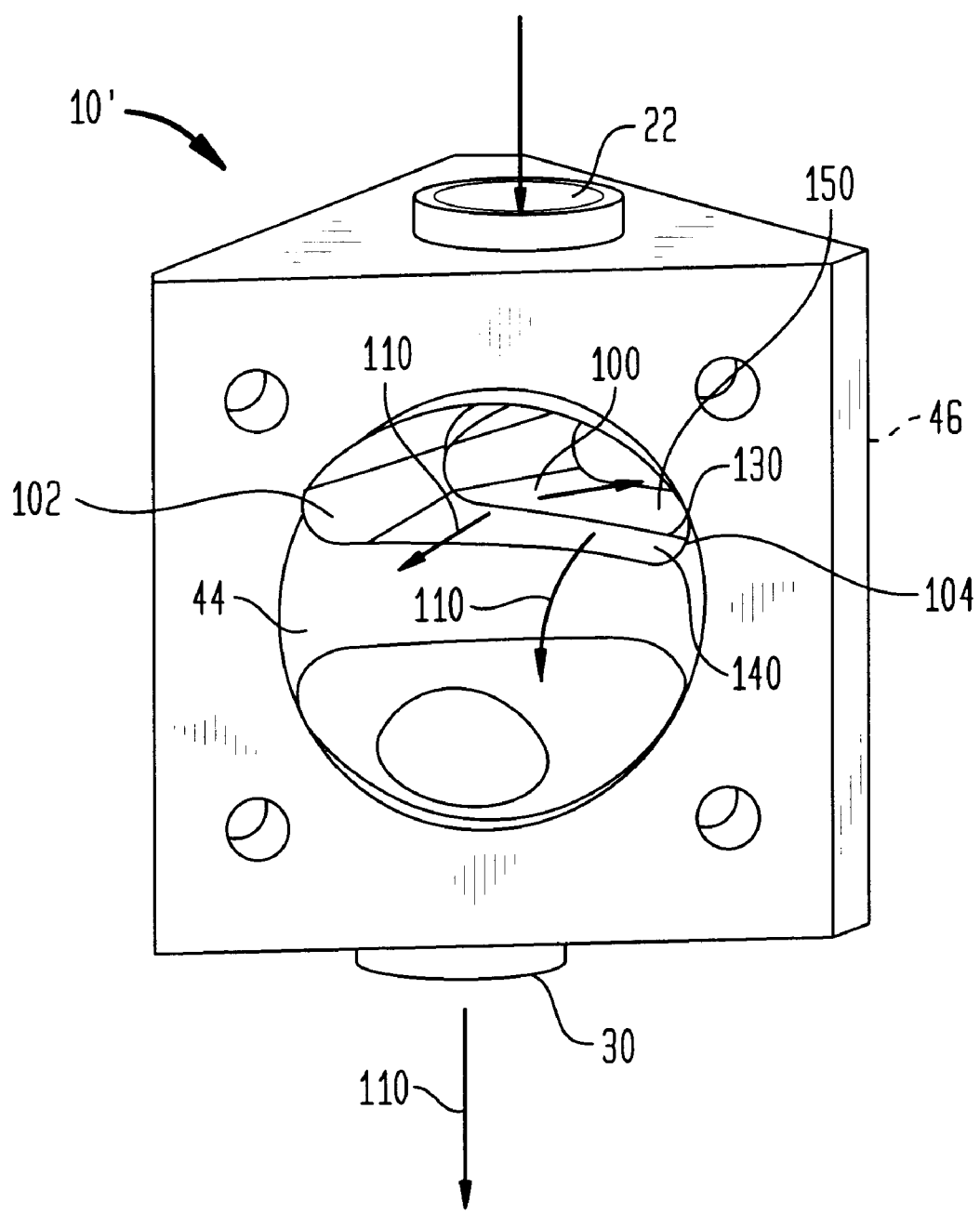
FIG. 5 is a perspective illustration of a diverter valve housing according to a first embodiment of the present invention.

Referring now to FIG. 5, there is illustrated a first embodiment of the housing 10' according to the present invention. Basically, the surface 100 is made to taper or slope from the divider 130 downwardly towards the edges 44 and 46. In other words, the surface 100 is made to include a raised ridge along the divider 130 thereof. This forms two surfaces 140, 150 which slope away from the divider 130 and towards the ports 30, 32. The arrows 110 of FIG. 5 illustrate the direction of drainage after the fluid flow has been halted. The drainage can be seen to move away from the divider 130 and towards both the compartments 36 and 38.

According to a preferred form of this first embodiment at least a portion of the edges 44 and 46 where the sloping surfaces 140, 150 meet the edges 44 and 46 are rounded or beveled to further reduce surface tension as fluid drains there over.

Figure 6:
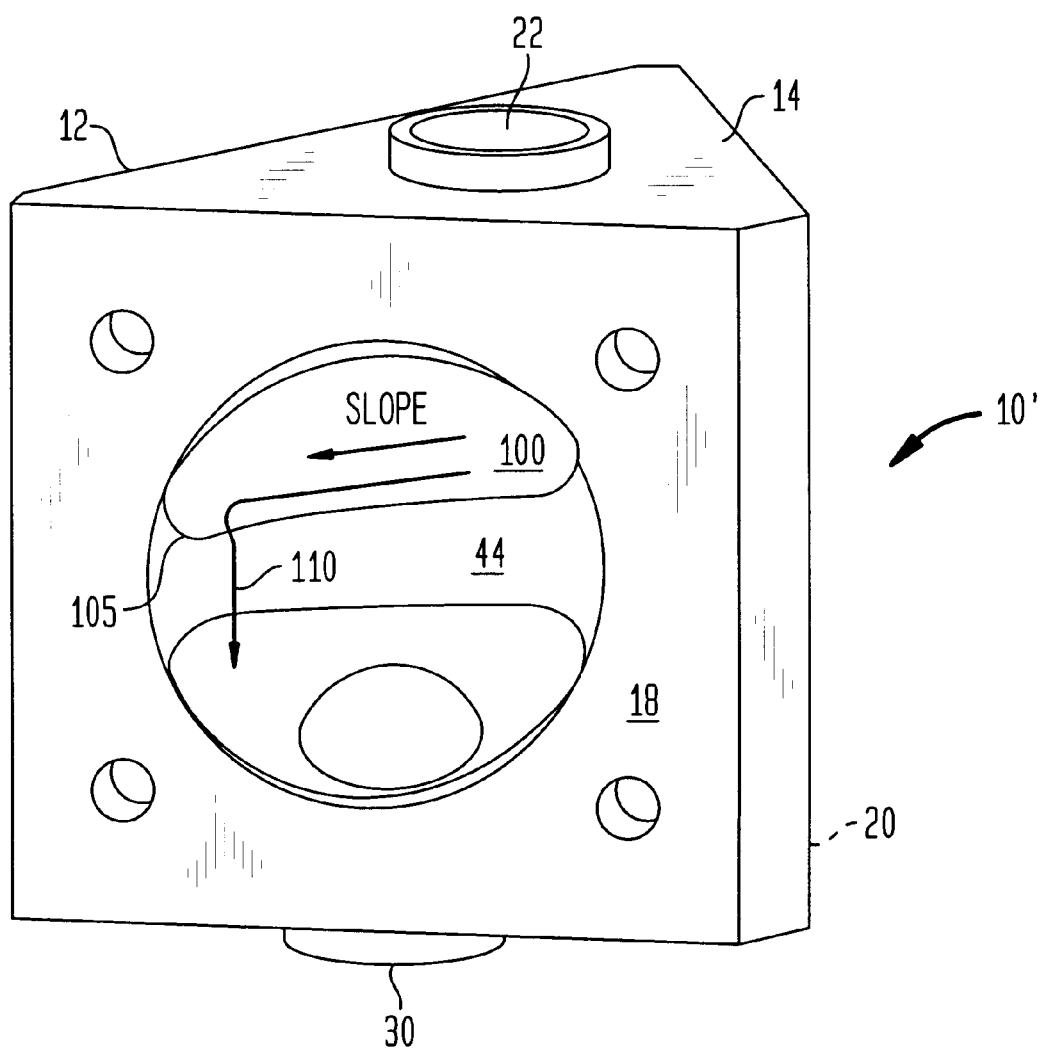
FIG. 6 is a perspective illustration of a diverter valve housing according to a second embodiment of the present invention; and, FIG. 7 is a perspective illustration of a diverter valve housing according to a third and preferred embodiment of the present invention.

Referring now to FIG. 6, there is illustrated a second embodiment of the present invention. Basically, in this second embodiment the surface 100 is sloped towards the base 12. The arrow 110 of FIG. 6 again illustrates the vertical drainage pattern, wherein the drainage is directed towards the base 12 and then towards the ports 30 and 32. Again, according to a preferred form of the second embodiment, the portion of the edges 44 and 46 where the sloping surface 100 meets the edges 44 and 46 which is nearest the base 12, designated by the reference 105, are rounded or beveled to further reduce surface tension as fluid drains there over.

Figure 7:
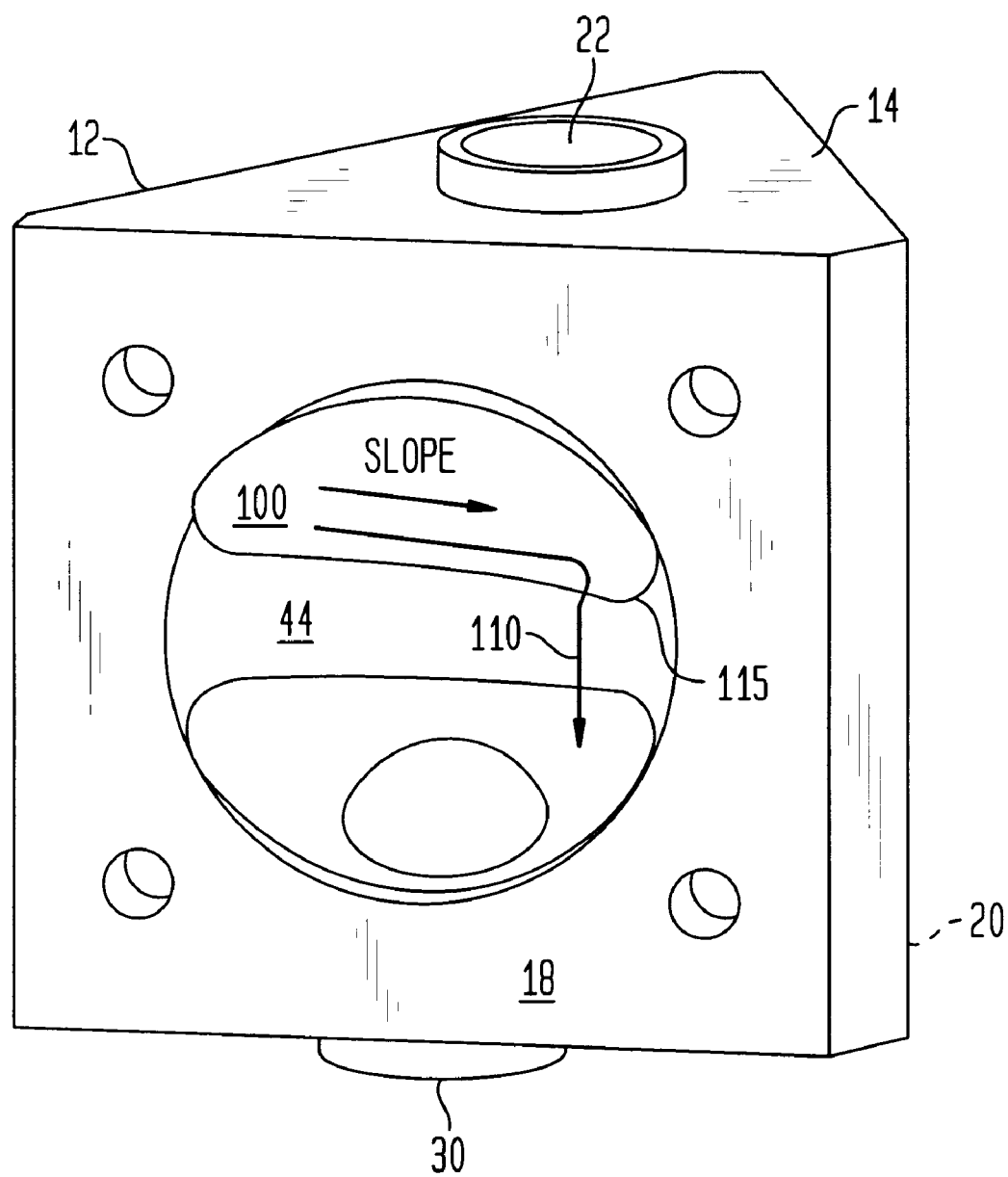

Referring now to FIG. 7, there is illustrated a preferred embodiment of the present invention. Basically, the surface 100 in the embodiment of FIG. 7 is sloped in an opposite direction from that of FIG. 6, or away from the base 12. As illustrated in FIGS. 1–7, the surface 100 takes a substantially triangular shape. The embodiment of FIG. 6 drains fluid away from the apex 104 (FIG. 5) of and towards the base 102 (FIG. 5) of the triangular surface 100, while the embodiment of FIG. 7 drains fluid away from the base 102 (FIG. 5) of and towards the apex 104 (FIG. 5) of the triangular surface 100. Accordingly, the embodiment of FIG. 7 is preferable to that of FIG. 6 in some applications, as fluid drainage is directed towards the apex or narrower portion of the triangular cross-section of the surface 100, thus reducing the surface area the draining fluid remains in contact with, thus further reducing the adverse effects of surface tension for example.

Again, according to a particularly preferred form of the preferred embodiment of FIG. 7, the portion of the edges 44 and 46 where the sloping surface 100 meets the edges 44 and 46, and which is furthest from the base 12, designated in FIG. 7 by reference 115, are rounded or beveled to further reduce surface tension as fluid drains there over.

Although the invention has been described and pictured in a preferred form with a certain degree of particularity, it is understood that the present disclosure of the preferred form and alternative embodiments has been made only by way of example, and that numerous changes in the details of construction and combination and arrangement of parts may be made without departing from the spirit and scope of the invention.

We claim:

1. A diverter valve housing comprising:
   a body including a base and a plurality of walls cooperatively forming a chamber;
   a partition within said chamber dividing said chamber into a plurality of compartments;
   a first port in a first of said walls and accessing a first of said compartments; and,
   second and third ports in a second of said walls and respectively accessing second and third ones of said compartments;
   wherein said partition further includes a surface which partially defines said first compartment and said surface is at least partially sloped towards said second wall and sloped relative to said base.

2. The housing of claim 1, further comprising first and second openings respectively formed in a third and a fourth of said walls.

3. The housing of claim 2, wherein said partition further bisects said first and second openings.

4. The housing of claim 3, wherein at least a portion of said partition which bisects said first or second opening is beveled.

5. The housing of claim 3, wherein said first compartment opens to said first port and said first and second openings.

6. The housing of claim 5, wherein said second compartment opens to said first opening and said second port.

7. The housing of claim 6, wherein said third compartment opens to said second opening and said third port.

8. The housing of claim 7, wherein said chamber includes a curved drainage channel formed therein at a bottom thereof.

9. The housing of claim 8, wherein said walls and said partition have means cooperative with said channel for defining a horizontal drainage plane within said body.

10. The housing of claim 9, wherein said means for defining a horizontal drainage plane comprises lowermost portions of said ports, openings, and partition which are contiguous with, and flair into said channel.

11. The housing of claim 1, wherein said surface includes a ridge therein which projects towards said first port and slopes progressively towards said second wall as it approaches said third and forth walls.

12. The housing of claim 1, wherein said surface slopes towards said base.

13. The housing of claim 1, wherein said surface slopes away from said base.

14. A housing suitable for use in a diverter valve, said housing comprising:
   a body including a substantially flat base and spaced-apart front, rear and side walls rising from said base, wherein said body forms a chamber having a curved drainage channel formed therein at the bottom thereof;
   a partition subdividing said chamber into compartments, wherein said walls and said partition includes means cooperative with said channel for defining a horizontal drainage plane within said body;

an inlet port formed in said front wall;

at least two outlet ports formed in said rear wall; and, at least one opening formed in each of said side walls;

wherein said partition includes means for bisecting said openings and a surface adjacent to said inlet port and being at least partially sloped towards at least one of said outlet ports and sloped relative to said base; and, said horizontal drainage plane defining means comprises lowermost portions of said ports, openings, and partition which are contiguous with, and flair into, said channel.

15. The housing of claim 14, wherein at least a portion of said partition which bisects said first or second opening includes a beveled edge.

16. The housing of claim 14, wherein said surface includes a ridge therein which projects towards said first port and slopes progressively towards at least one of said outlet ports.

17. The housing of claim 14, wherein said surface slopes towards said base.

18. The housing of claim 14, wherein said surface slopes away from said base.

19. The housing of claim 18, wherein at least a portion of said partition which bisects said first or second opening includes a beveled edge.

20. A housing suitable for use in a diverter valve including:

a body including a base and a plurality of walls cooperatively forming a chamber;

a partition within said chamber dividing said chamber into a plurality of compartments;

a first port in a first of said walls and accessing a first of said compartments; and, second and third ports in a second of said walls and respectively accessing second and third ones of said compartments; and, a curved drainage channel formed within said chamber at a bottom thereof adjacent to said base adapted for improving drainage of said housing when said housing is horizontally disposed;

wherein said partition further includes a surface which partially defines said first compartment and said surface is at least partially sloped towards said second wall and sloped relative to said base such as to improve drainage of said housing when said housing is vertically disposed.

* * * * *